United States Patent [19]

Giorgetti

[11] 4,231,906
[45] Nov. 4, 1980

[54] INK COMPOSITION FOR NON WOVEN FABRICS OF SYNTHETIC FIBERS

[75] Inventor: Maurizio Giorgetti, Busto Arsizio, Italy

[73] Assignee: ATEX/U.S.A., Inc., Asheville, N.C.

[21] Appl. No.: 968,297

[22] Filed: Dec. 11, 1978

[51] Int. Cl.$^3$ ............... C09D 11/06; C09D 11/10; C09D 11/12

[52] U.S. Cl. ............... 260/19 N; 106/28; 106/31; 106/245; 106/264; 260/19 R; 260/DIG. 38; 8/513

[58] Field of Search ............... 106/28, 31, 264, 245; 260/DIG. 38, 19 R, 19 N; 8/41 D, 180, 4

[56] References Cited

U.S. PATENT DOCUMENTS

| | | | |
|---|---|---|---|
| 2,146,598 | 2/1939 | Sherburne | 260/19 R |
| 2,455,541 | 12/1948 | Waldie | 260/19 N |
| 2,574,971 | 11/1951 | Heltzer | 260/19 N |
| 2,906,590 | 9/1959 | Evans | 8/4 |
| 3,150,917 | 9/1964 | Gagliardi | 8/4 |
| 3,182,105 | 5/1965 | Bonvicini et al. | 8/180 |
| 3,273,498 | 9/1966 | Martin | 106/28 |
| 4,115,329 | 9/1978 | Noshiro et al. | 260/19 R |

FOREIGN PATENT DOCUMENTS

| | | | |
|---|---|---|---|
| 979555 | 12/1975 | Canada | 260/19 R |
| 2009351 | 1/1970 | France | 106/31 |
| 51340 | 6/1966 | Poland | 106/264 |

*Primary Examiner*—Ronald W. Griffin
*Attorney, Agent, or Firm*—Clarence A. O'Brien; Harvey B. Jacobson

[57] ABSTRACT

An ink composition is provided for the lithographic imprinting of non woven fabrics constituted of polyethylene fibers, such a composition comprising a pigment, a desiccant, a binder based on isophthalic and/or urethane varnish, a protective wax and an oleoresinous varnish consisting of phenolic resin, linseed oil, tung oil and high boiling mineral oil.

6 Claims, No Drawings

INK COMPOSITION FOR NON WOVEN FABRICS OF SYNTHETIC FIBERS

BACKGROUND OF THE INVENTION

The invention relates to an ink composition that is particularly for the printing of non woven fabrics constituted of synthetic fibers. More in particular, the invention concerns an ink composition for the lithographic imprinting of non woven fabrics constituted of polyolefinic synthetic fibers, e.g. polyethylene.

In the lithographic imprinting of said non woven fabrics, for example, the farics known commercially by the name TYVEK, a product of the E. I. DuPont de Nemours Co., there is a well recognized and heretofore unsurpassed technical difficulty of producing a satisfactory and durable chemical linkage between the ink that is utilized for the imprinting and the substrates of the non woven fabrics. The inks that have been heretofore utilized in the attempting to provide suitable lithographic imprinting of the polyolefinic non woven fabrics have constantly produced negative results. This is because the inks do not adhere to the non woven fabric or because the inks must be subjected to a prolonged desiccation time, as much as or more than two or three days. As a result, such inks are not only unacceptable from an economic point of view, but also create a film that lines the non woven fabric and is fragile to the point of breakage when the fabrics are flexed.

Accordingly, it is an object of the invention to provide an ink composition for the lithographic imprinting of polyolefinic non woven fabrics.

A related object is to achieve suitable imprinting of polyethylene non woven fabric (TYVEK), with known imprinting technique in a suitably limited time.

In accomplishing the foregoing and related objects, the invention provides an ink composition for the imprinting of polyolefinic non woven fabrics, comprising a pigment, a desiccant, a binder based on isophthalic and/or urethane varnish, a polyethylene protective wax and characterized in that it comprises between 54 and 64 percent by weight of an oleoresinous varnish consisting of a phenolic resin, crude linseed oil, tung oil and high boiling mineral oil.

In accordance with one aspect of the invention, the oleoresinous varnish comprises ingredients with the following preferred percentages by weight:

| | |
|---|---|
| Modified phenolic resin | 39% |
| Bleached neutral crude linseed oil | 20% |
| tung (Chinese wood) oil prepared at 230° C. | 10% |
| High boiling mineral oil prepared at 190° C. | 31% |

The foregoing ingredients are according to the following illustrative and non-limiting procedure.

A pigment constituted of 12.75 parts of yellow benzidine solid and 0.25 parts of orange solid is fed into a turbo-mixer whose paddle shaft is rotated at a velocity of 1200 revolutions per minute. These pigments give the ink a desired color which is known as "medium yellow". It will be understood that other pigments, both solid and liquid, particularly of the azo type may also be used.

Contemporaneously with the pigment, a binder is loaded into the turbo-mixer. An illustrative binder is formed by 10 parts by weight of isophthalic varnish which is sold and marketed in commerce under the designation "100/S" by the firm of Massimilano Massa; 8 parts by weight of a urethane varnish which is sold and marketed in commerce under the designation "UROSET" by the above-mentioned firm of M. Massa; 3 parts by weight of a polyethylene wax which is sold and marketed in commerce by the firm of Heigenmann & Veronelli; and 40 parts by weight of an oleoresinous varnish.

The oleoresinous varnish is prepared by heating at 220° C. in an open cauldron, 39 parts of modified phenolic resin sold and marketed under the name "Sirfenol" by SIR Company; 20 parts of neutral bleached crude linseed oil normally found in commerce; 10 parts of tung (Chinese wood) oil which is also prepared at 230° C.; and 31 parts of high boiling mineral oil of the kind prepared at 190° C. and known, for example as "Shell ink solvent 2729".

After about 50 minutes of mixing in the turbo-mixer, the material is unloaded and subjected to refining in a conventional refining device with three cylinders and a minimum of three passages. A final addition is then made of 23 parts of the oleoresinous varnish mentioned above, together with 3 parts of an inorganic component desiccant of cobalt manganese-naphthenate, which is normally available in commerce.

The resulting refined product is unloaded as an ink which is utilized for the lithographic imprinting a non woven fabric constituted of polyolefinic fibres, in particular the non woven fabric commercially sold by DuPont Company under the name "TYVEK".

In the testing of the TYVEK fabric lithographically imprinted with the "medium yellow" ink composition obtained above, the following results were obtained:

The required desiccation time was limited to between one hour and one half hours;

The resistance to light had a index of 5 on the conventional light index scale;

The imprint showed significant resistance to washing. When the material was washed as a delicate textile with a bland detergent there was no color change after six and seven cycles of washing;

The feel of the imprinted non woven fabric after repeated washings and prolonged periods of storage remained unchanged;

The material demonstrated a noteworthy resistance to abrasion.

Accordingly the invention satisfies the objectives and provides the scope suggested above.

The foregoing description is for illustration only and various changes as well as substitution of equivalents for those shown and described may be made without departing from the spirit and scope of the invention as set forth in the appended claims.

What is claimed is:

1. An ink composition for the imprinting of polyolefinic non woven fabrics, comprising a pigment, a desiccant, a binder based on isophthalic and/or urethane varnish, a polyethylene protective wax and characterized in that it comprises between 54 and 64 percent by weight of an oleoresinous varnish consisting of a phenolic resin, crude linseed oil, tung oil and high boiling mineral oil, the composition being further characterized in that it imparts significant resistance to washing of the polyolefinic non woven fabrics such that when said fabric is washed as a delicate textile with a bland detergent, no discernible color change occurs after as many as six or seven cycles of washing, the composition being further characterized in that it imparts a feel or "hand"

to said imprinted polyolefinic non woven fabric which remains unchanged after repeated washings and prolonged period of storage, the composition being further characterized in that said imprinted polyolefinic non woven fabric demonstrates substantial resistance to abrasion, the composition being further characterized in that said imprinting of polyolefinic non woven fabrics can be carried out lithographically with a desiccation time substantially less than two days, and characterized by a durable chemical linkage between the ink and the non woven fabric such that breakage does not occur under flexing of the fabric.

2. An ink composition according to claim 1 in which said oleoresinous varnish comprises ingredients with the following percentages by weight:

| | |
|---|---|
| Phenolic resin | 39% |
| Bleached neutral crude linseed oil | 20% |
| tung (Chinese wood) oil prepared at 230° C. | 10% |
| High boiling mineral oil prepared at 190° C. | 31% |

3. The composition of claim 1 wherein said polyolefinic non woven fabrics are polyethylene non woven fabrics.

4. The composition of claim 1 wherein said desiccation time is 1 to 1½ hours.

5. An ink composition for the imprinting of polyolefinic non woven fabrics comprising (percentages by weight)

| | |
|---|---|
| a pigment | 10–20% |
| isophthalic varnish | 10% |
| urethane varnish | 8% |
| oleoresinous varnish | 54–64% |
| polyethylene wax | 3% |
| cobalt manganese-naphthenate desiccant | 3% |

6. A process for making an ink composition for the imprinting of polyolefinic non woven fabrics, comprising the following steps:

(a) preparing an oleoresinous varnish by heating at 220° C. in an open cauldron 39 parts of phenolic resin, 20 parts of neutral bleached linseed oil, 10 parts of tung oil prepared at 230° C., and 31 parts of high boiling mineral oil prepared at 190° C.;

(b) mixing the components from step (a) for about 50 minutes;

(c) unloading and subjecting the mixture from step (b) to refining in a conventional refining device having three cylinders with a minimum of three passages;

(d) adding to the product of (c) 23 parts of the same oleoresinous varnish of step (a), together with 3 parts of a desiccant comprising cobalt, manganese-naphthenate;

(e) removing the product of step (d) for utilizing in lithographic imprinting of said non woven polyolefinic fabric.

* * * * *